(12) United States Patent
Yang

(10) Patent No.: US 9,074,899 B2
(45) Date of Patent: Jul. 7, 2015

(54) OBJECT GUIDING METHOD, MOBILE VIEWING SYSTEM AND AUGMENTED REALITY SYSTEM

(71) Applicant: Acer Incorporated, New Taipei (TW)

(72) Inventor: Chao-Kuang Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 175 days.

(21) Appl. No.: 13/896,302

(22) Filed: May 16, 2013

(65) Prior Publication Data

US 2013/0253824 A1 Sep. 26, 2013

Related U.S. Application Data

(63) Continuation-in-part of application No. 12/609,182, filed on Oct. 30, 2009, now Pat. No. 8,838,375.

(30) Foreign Application Priority Data

May 11, 2009 (TW) .............................. 98115561 A

(51) Int. Cl.
  *G01C 21/20* (2006.01)
  *G01C 21/00* (2006.01)
  *G01S 19/53* (2010.01)
  *G06T 19/00* (2011.01)

(52) U.S. Cl.
  CPC .............. *G01C 21/206* (2013.01); *G01C 21/00* (2013.01); *G01S 19/53* (2013.01); *G01C 21/20* (2013.01); *G06T 19/006* (2013.01)

(58) Field of Classification Search
  USPC ......... 701/400, 408, 409, 431, 438, 439, 440, 701/441, 442, 444, 445, 446, 447, 448, 454, 701/459, 466, 467, 469, 532, 537, 300, 701/302; 340/944, 988, 995.1, 995.14, 340/995.17, 995.22, 995.24, 995.26, 340/995.27; 342/450
  See application file for complete search history.

(56) References Cited

U.S. PATENT DOCUMENTS

| | | | |
|---|---|---|---|
| 8,681,178 B1* | 3/2014 | Tseng ........................... | 345/633 |
| 2006/0004514 A1* | 1/2006 | Bennett et al. ................ | 701/208 |
| 2008/0319646 A1* | 12/2008 | Hopkins et al. ............... | 701/201 |
| 2009/0187339 A1* | 7/2009 | DeVries et al. ............... | 701/208 |
| 2011/0282572 A1* | 11/2011 | DeVries et al. ............... | 701/200 |
| 2013/0127980 A1* | 5/2013 | Haddick et al. ............ | 348/14.08 |
| 2013/0278631 A1* | 10/2013 | Border et al. ................. | 345/633 |
| 2014/0055490 A1* | 2/2014 | Mule et al. .................... | 345/633 |

* cited by examiner

Primary Examiner — Thomas Tarcza
Assistant Examiner — Edward Pipala
(74) Attorney, Agent, or Firm — Jianq Chyun IP Office

(57) ABSTRACT

An augmented reality system having a server and a mobile viewing is provided. The mobile viewing system registers that the mobile viewing system enters a building at the server. Several wireless access points are disposed in the building, and the mobile viewing system is connected to some of the wireless access points. The mobile viewing system receives a request message from the server and captures an image via an image capture module according to the request message. The server obtains a location of the mobile viewing system according to the connected wireless access points and the image captured, and generates an object guiding message or an object indicating message according to the location of the mobile viewing system. The mobile viewing system displays the object guiding message or the object indicating message on the viewing unit.

20 Claims, 13 Drawing Sheets

OBJECT GUIDING METHOD, MOBILE VIEWING SYSTEM AND AUGMENTED REALITY SYSTEM

CROSS-REFERENCE TO RELATED APPLICATION

This application is a continuation-in-part application of and claims the priority benefit of a prior application Ser. No. 12/609,182, filed on Oct. 30, 2009, now pending. The prior application Ser. No. 12/609,182 claims the priority benefit of Taiwan application serial no. 98115561, filed on May 11, 2009. The entirety of each of the above-mentioned patent applications is hereby incorporated by reference herein and made a part of this specification.

BACKGROUND

1. Technology Field

The present invention relates to a system with object guiding function and the method thereof, and more particularly to a mobile viewing system which may display an object indicating message or an object guiding message in a view window area, an object indicating method and an augmented reality system.

2. Description of Related Art

Thanks to the matured technology and the popularization of the global positioning system (GPS), various kinds of satellite navigation devices have been developed and become a reliable and prerequisite guiding tool for drivers or travelers. By receiving positioning signals from at least three GPS satellites, the satellite navigation device may calculate its geographical coordinates. The navigation device may be used with an appropriate electronic map to provide the user with the information about the user's current position. Furthermore, when the user inputs a destination, the satellite navigation device may calculate based on the electronic map to plan out a path to the destination and guides the user to drive through the planned path.

However, the currently available civilian GPS is subject to limited accuracy. That is, the civilian GPS does not always provide highly precise positioning, and the positioning error varies with the user's current position and may range from several ten meters to several hundred meters. Therefore, particularly in cities, there are chances the satellite navigation device informs the user the destination is reached but the user fails to see the destination or is blocked by something on the way to the destination and gets lost. Besides, the satellite navigation device seems to be less useful when the user needs short-distance navigation aid.

SUMMARY

Embodiments of the invention is directed to an object indicating method, an augmented reality system, and a mobile viewing system, in which some information is provided when a user enters a building.

According to an embodiment of the invention, an object indicating method is provided for an augmented reality system having a mobile viewing system and a server. The object indicating method has steps: registering that the mobile viewing system enters a building at the server, wherein a plurality of wireless access points are disposed in the building, and the mobile viewing system is connected to at least one first wireless access points among the wireless access points; receiving a first request message from the server and capturing an image via the image capture module according to the first request message; obtaining a location of the mobile viewing system according to the first wireless access points and the image captured by the image capture module; generating an object guiding message or an object indicating message according to the location of the mobile viewing system; displaying the object guiding message or the object indicating message on the viewing unit.

According to an embodiment of the invention, an augmented reality system is provided having a server a mobile viewing system comprising an image capture module and a viewing unit. The mobile viewing system registers that the mobile viewing system enters a building at the server, wherein a plurality of wireless access points are disposed in the building, and the mobile viewing system is connected to at least one first wireless access points among the wireless access points. The mobile viewing system receives a first request message from the server and captures an image via the image capture module according to the first request message. The server obtains a location of the mobile viewing system according to the first wireless access points and the image captured by the image capture module, and generates an object guiding message or an object indicating message according to the location of the mobile viewing system. The mobile viewing system displays the object guiding message or the object indicating message on the viewing unit.

According to an embodiment of the invention, a mobile viewing system is provided comprising a viewing unit, an image capture module, and a processing unit. The processing unit registers that the mobile viewing system enters a building at the server, wherein a plurality of wireless access points are disposed in the building, and the mobile viewing system is connected to at least one first wireless access points among the wireless access points. The processing unit receives a first request message from the server and the image capture module captures an image according to the first request message. The processing unit displays an object guiding message or an object indicating message received from the server on the viewing unit, wherein a location of the mobile viewing system is obtained by the server according to the first wireless access points and the image captured by the image capture module, and the object guiding message or the object indicating message is generated by the server according to the location of the mobile viewing system

BRIEF DESCRIPTION OF THE DRAWINGS

The structure and the technical means adopted by the present invention to achieve the above and other objects may be best understood by referring to the following detailed description of the preferred embodiments and the accompanying drawings, wherein.

DESCRIPTION OF THE EMBODIMENTS

Figure 1:
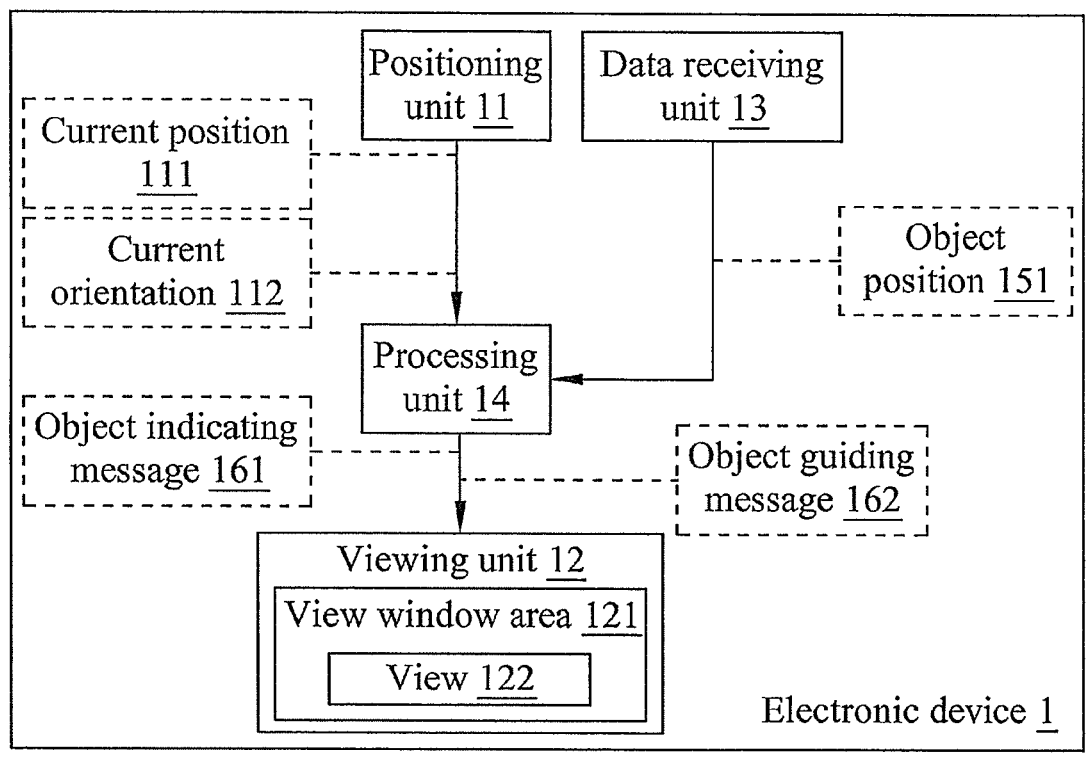
FIG. 1 is a block diagram of an electronic device with object guiding function according to the present invention.

Please refer to FIG. 1 that is a block diagram of an electronic device with object guiding function according to the present invention, which is generally denoted by reference numeral 1 and also briefly referred to as the electronic device 1 herein, and to FIGS. 2 to 5 that are schematic views showing the operation of the electronic device 1. As may be seen from FIG. 1, the electronic device 1 includes a positioning unit 11, a viewing unit 12, a data receiving unit 13, and a processing unit 14. The positioning unit 11 provides the current position 111 and the current orientation 112 of the electronic device 1. Preferably, the positioning unit 11 is a global positioning system (GPS) module, an assisted global positioning system (AGPS) module, an electronic compass, or a gyroscope. The GPS module and the AGPS module are able to calculate the geographic coordinates of the electronic device 1; and the electronic compass or the gyroscope is able to provide 2D or 3D orientation of the electronic device 1. The viewing unit 12 includes a view window area 121, via which a user may watch a view 122. Depending on actual need, the viewing unit 12 may include an image acquisition module, an optical module, or a light-transmitting mechanism for receiving optical signals, and a display module or a projection module for displaying related information.

The data receiving unit 13 receives data about the position 151 of an object 15. The object 15 is preferably a constellation, a building, a mountain range, a moving object, or a person. Depending on actual need, the data receiving unit 13 may include a network linking module or a wireless communication module for receiving object data transmitted from a remote location. The data receiving unit 13 may also include an input module and a data storage module according to actual need, allowing a user to select on the electronic device 1 an object stored in the data storage module. The viewing unit 12 may show at least one selectable object stored in the data storage module, and a user may select one of the selectable objects via the input module. The input module may be a keyboard, a keypad, a cursor controller, or a touch-control module.

The processing unit 14 calculates based on the current position 111, the current orientation 112, and the view window area 121 of the electronic device 1 to obtain a coverage 123 of the view 122 shown in the view window area 121, and then, based on the position 151 of the object 15, determines whether the object 15 is located in the coverage 123 of the view 122 and generates an object indicating message 161 or an object guiding message 162 according to the above determination. The processing unit 14 is preferably a microcontroller or a central processing unit (CPU). And, the coverage 123 is preferably defined as an area extended from an angle of view 1231 of the viewing unit 12, and may be a 2D area or a 3D space.

Figure 2:
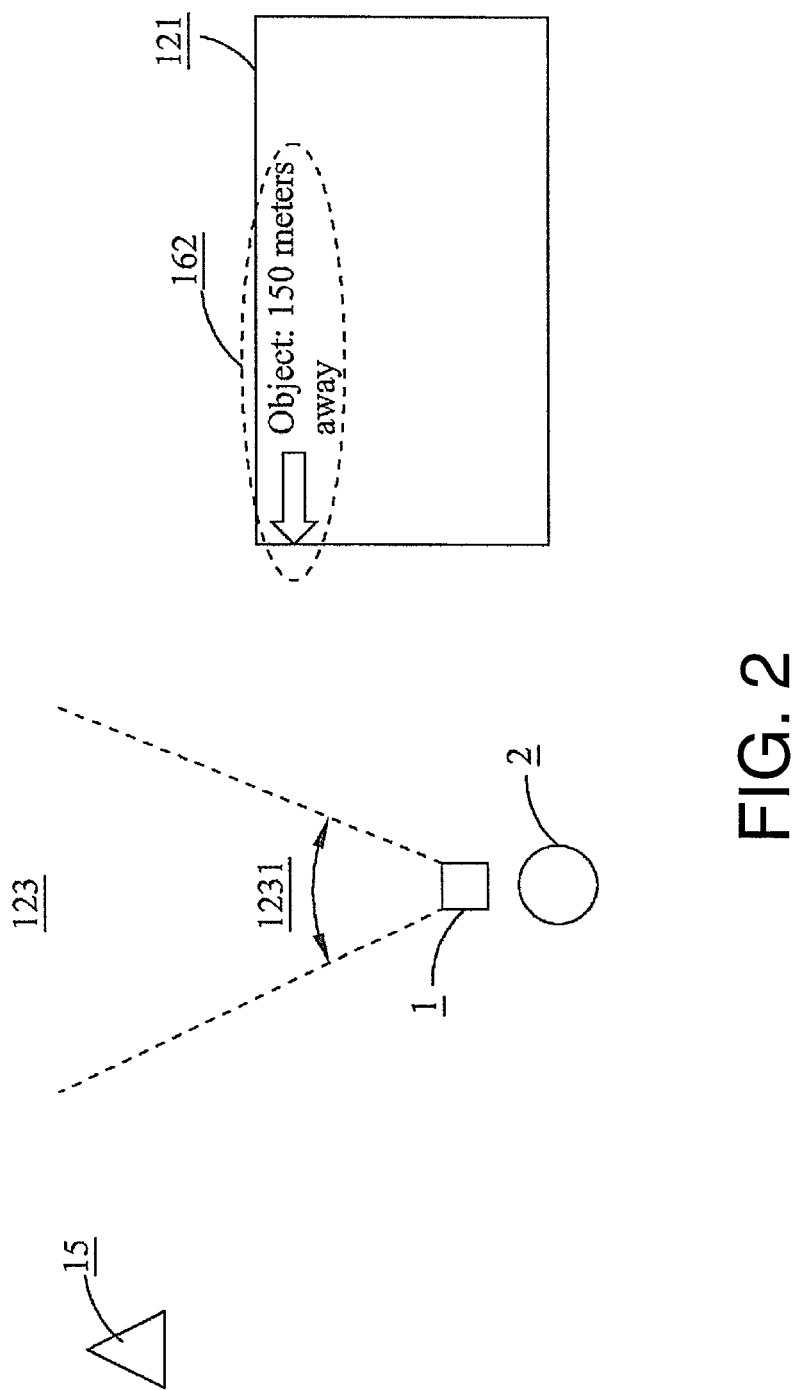
FIGS. 2 to 5 are schematic views showing the operation of the electronic device with object guiding function according to the present invention.
Figure 3:
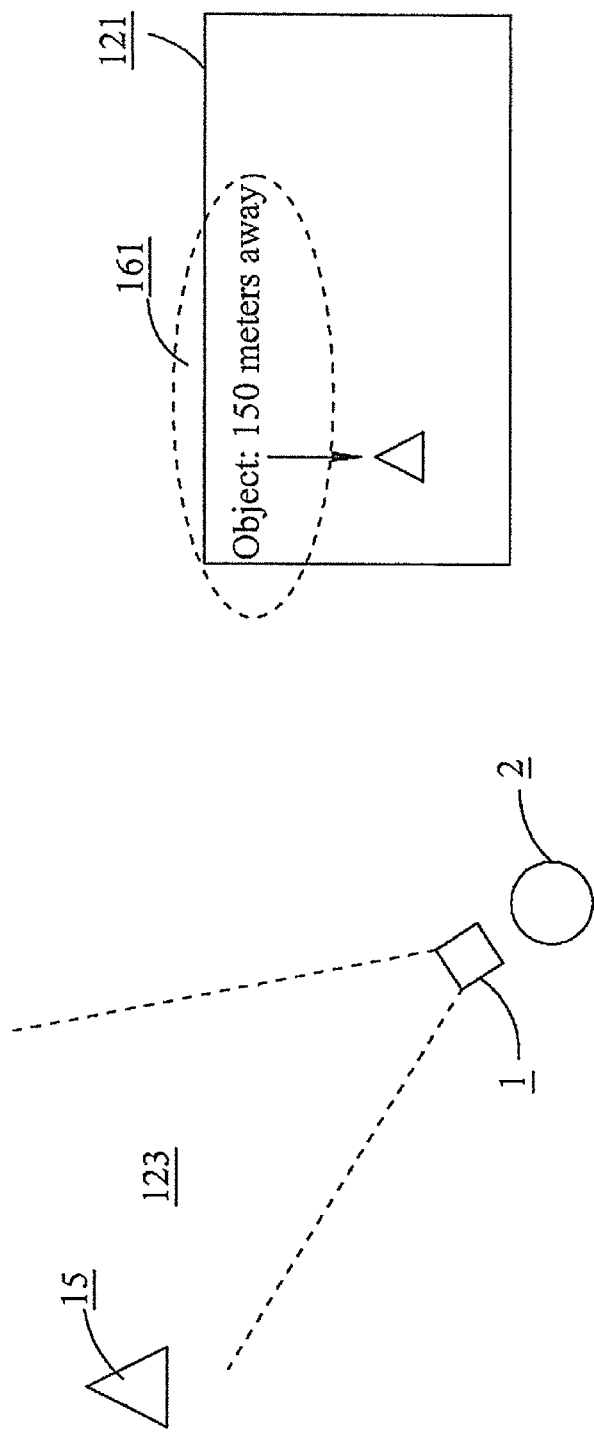
Figure 4:
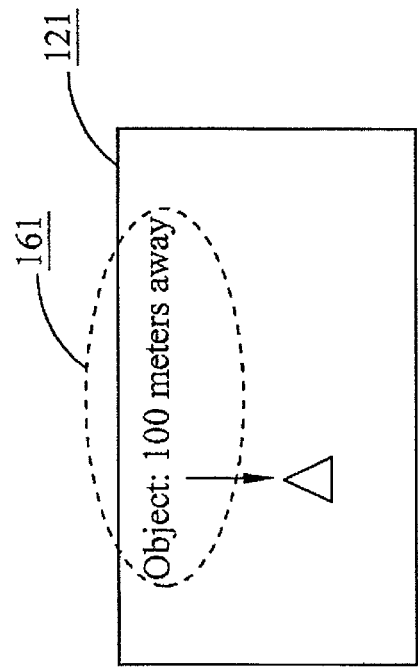
Figure 4:
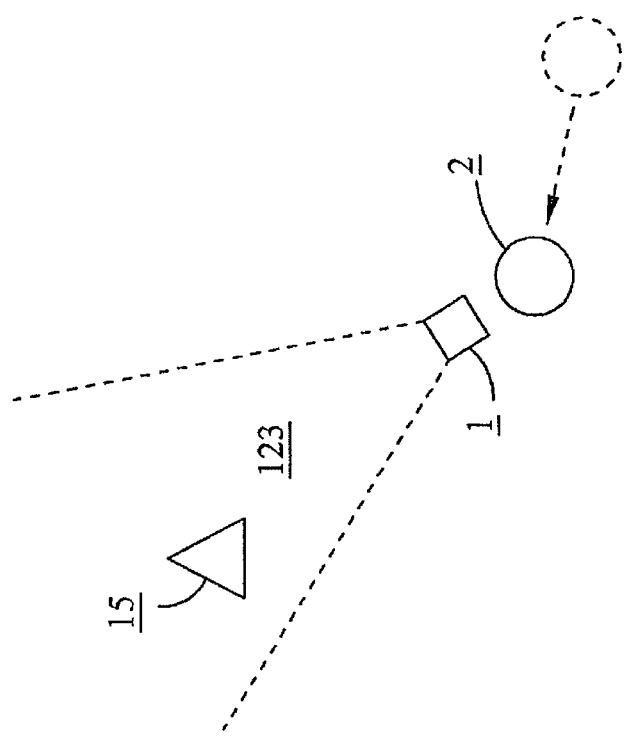

The viewing unit 12 correspondingly shows the object indicating message 161 or the object guiding message 162 in the view window area 121. The object guiding message 162 may be used to guide a user 2 to change the electronic device 1 to a different orientation, so that the object 15 may be located in the view window area 121. As shown in FIG. 2, the object guiding message 162 reminds the user 2 to turn left for the object 15 to move into the coverage 123. On the other hand, the object indicating message 161 indicates information about the object 15, such as the name, the image, the attribution, or the address of the object, the position of the object 15 in the view window area 121, or the distance between the object 15 and the electronic device 1. As shown in FIG. 3, the object indicating message 161 reminds the user of a position of the object 15 in the view window area 121, and indicates the object 15 is distant from the electronic device 1 by 150 meters. Thus, even if the object 15 may not be directly shown in the view window area 121, the user 2 may still know from the object indicating message 161 the orientation of and the distance to the object 15. Further, the electronic device 1 is able to constantly update the object indicating message 161. As shown in FIG. 4, when the user 2 moves to a new position, the electronic device 1 also updates the position of the object indicating message 161 in the view window area 121, and updates the distance between the object 15 and the electronic device 1 to read 100 meters.

Figure 5:
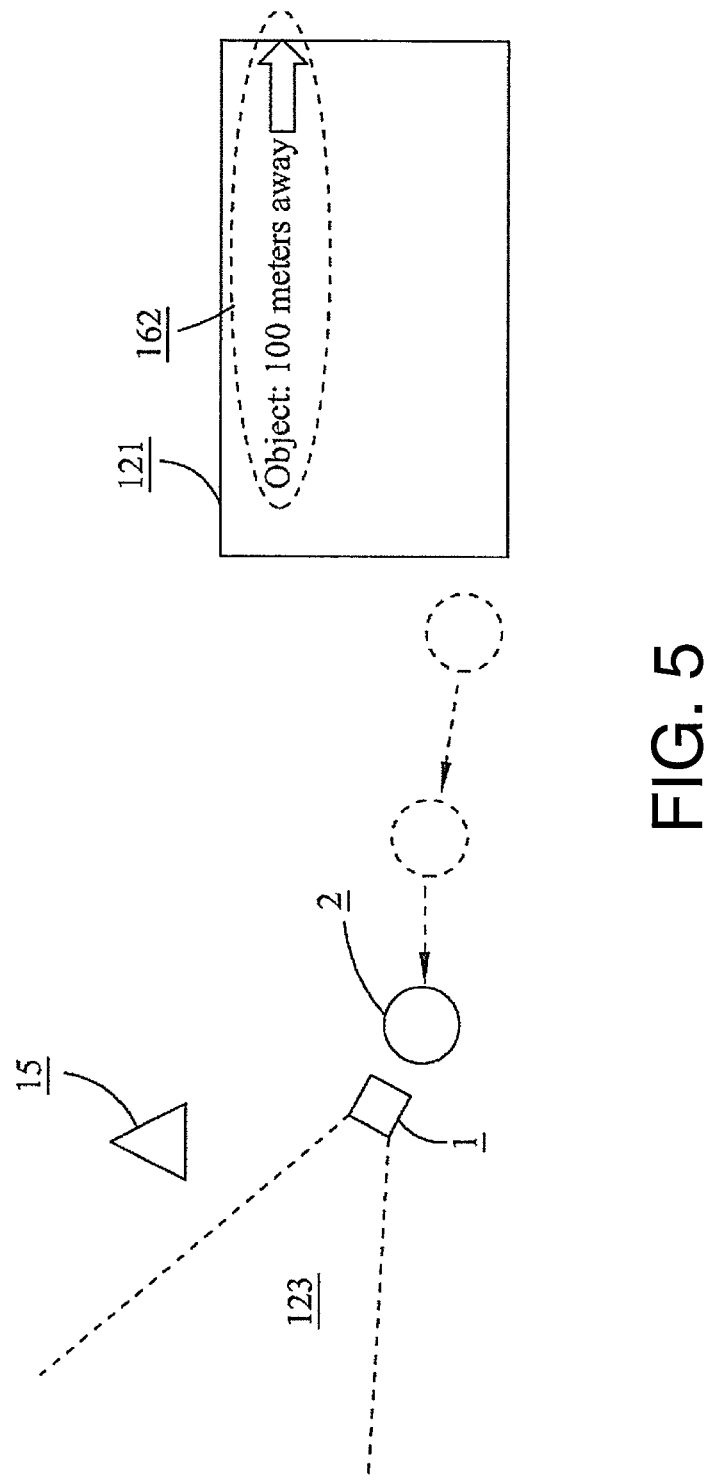

In the case the user 2 is navigated to a destination but fails to locate the exact address of the destination, the user may first determine the orientation of the destination through the above-described operations to gradually approach the destination. If the destination could not be straightly reached due to roads or other constructions, and the object 15 moves out of the coverage 123 of the view 122 when the user 2 turns while approaching to the destination, the electronic device 1 will change to show the object guiding message 162 to remind the user that, for example, the object 15 is now located at the right side of the user 2, as shown in FIG. 5. In this manner, the user 2 may be effectively guided to reach at the destination. The object guiding message 162 is not only limited to remind the user to move leftward or rightward, but also remind the user to move upward or downward and forward or backward, depending on the actual design of the electronic device 1.

In the case there is constellation information stored thereon, the electronic device 1 may also be used to guide the user to observe a specific constellation. And, the electronic device 1 may also be used to guide the user to approach to a moving object, such as the user's friend or family in moving, if the electronic device 1 is able to continuously receive the position of the moving object.

Figure 6:
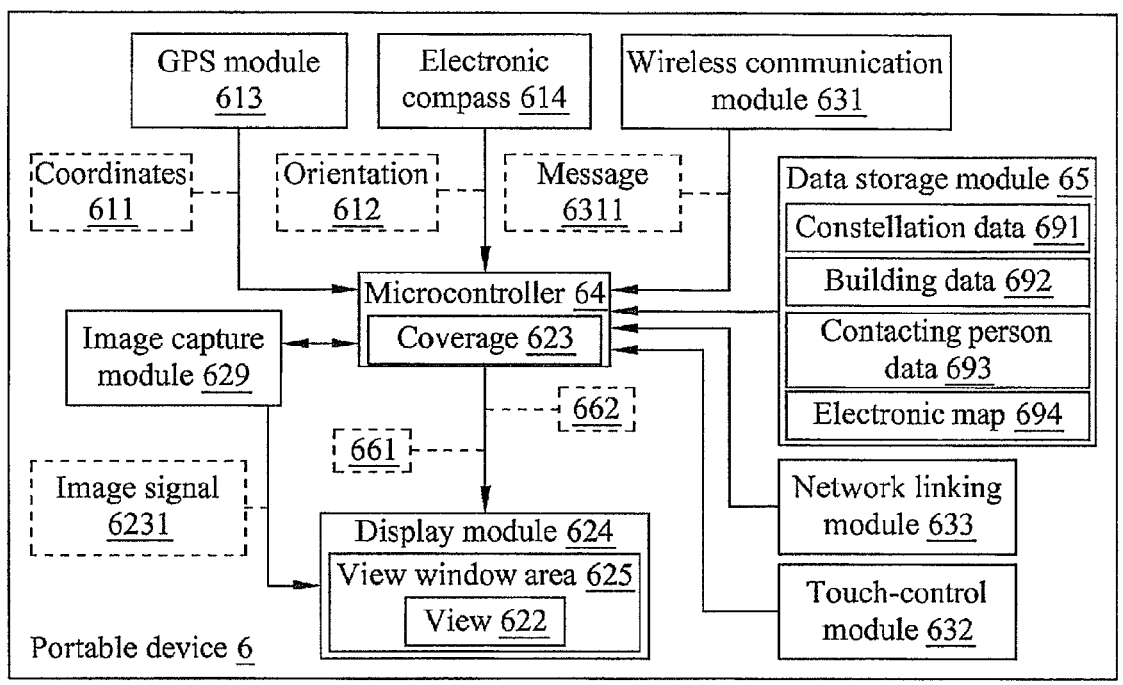
FIG. 6 is a block diagram of an electronic device with object guiding function according to a first embodiment of the present invention.

FIG. 6 is a block diagram of an electronic device with object guiding function according to a first embodiment of the present invention. In the first embodiment, the electronic device is a portable device 6, which includes a GPS module 613, an electronic compass 614, an image acquisition module 629, a display module 624, a wireless communication module 631, a touch-control module 632, a network linking module 633, a microcontroller 64, and a data storage module 65. The GPS module 613 receives a plurality of satellite signals and calculates these satellite signals to derive coordinates 611 of the portable device 6. The electronic compass 614 outputs the orientation 612 of the portable device 6. Since the function and the operating principle of the GPS module 613 and the electronic compass 614 are known by one of ordinary skill in the art, they are not discussed in details herein. The image acquisition module 629 acquires an image signal 6231 corresponding to an external view 622. The microcontroller 64 controls the display module 624 to show the image signal 6231. The display module 624 has a screen defined as a view window area 625. Via the view window area 625, a user may watch the image of the view 622 acquired by the image acquisition module 629.

The data storage module 65 has a plurality of object data stored therein, such as constellation data 691, building data 692, contacting person data 693, and an electronic map 694. The constellation data 691 includes the position of at least one constellation or related information about the constellation. Based on the constellation data 691, the current time and the current coordinates of the portable device 6, the microcontroller 64 is able to calculate and derive the orientation of the constellation. The building data 692 includes the position of at least one building or related information about the building. The contacting person data 693 includes the address or position of at least one contacting person or related information about the contacting person. The electronic map 694 includes a plurality of road information. The user may operate the touch-control module 632 to select one of the object data stored in the data storage module 65.

The microcontroller 64 may calculate an angle of view of the image acquisition module 629 based on an imaging model of the image acquisition module 629, such as a pinhole model, and the imaging area and focal length of the image acquisition module 629, so as to derive a coverage 623 of the view 622 acquired by the image acquisition module 629. In the case the user does not select a desired guide mode on the portable device 6, the microcontroller 64 may compare the object data stored in the data storage module 65 with the coverage 623 to determine what objects are located in the coverage 623. Herein, the objects in the coverage 623 are objects that may be seen by the user via the view window area 625. Then, the microcontroller 64 generates at least one object indicating message 661.

In the case the user selects a desired guiding mode on the portable device 6, the microcontroller 64 will compare the user-selected object with the coverage 623 to determine whether the selected object is located in the coverage 623. If yes, the microcontroller 64 generates an object indicating message 661 corresponding to the selected object. On the other hand, when the selected object is not located in the coverage 623, the microcontroller 64 will determine the selected object is located at which side of the coverage 623 to thereby generate an object guiding message 662. For instance, when it is determined the selected object is located at a left side of the coverage 623, the microcontroller 64 will generate an object guiding message to guide the user to turn left, as shown in FIG. 2.

Figure 7:
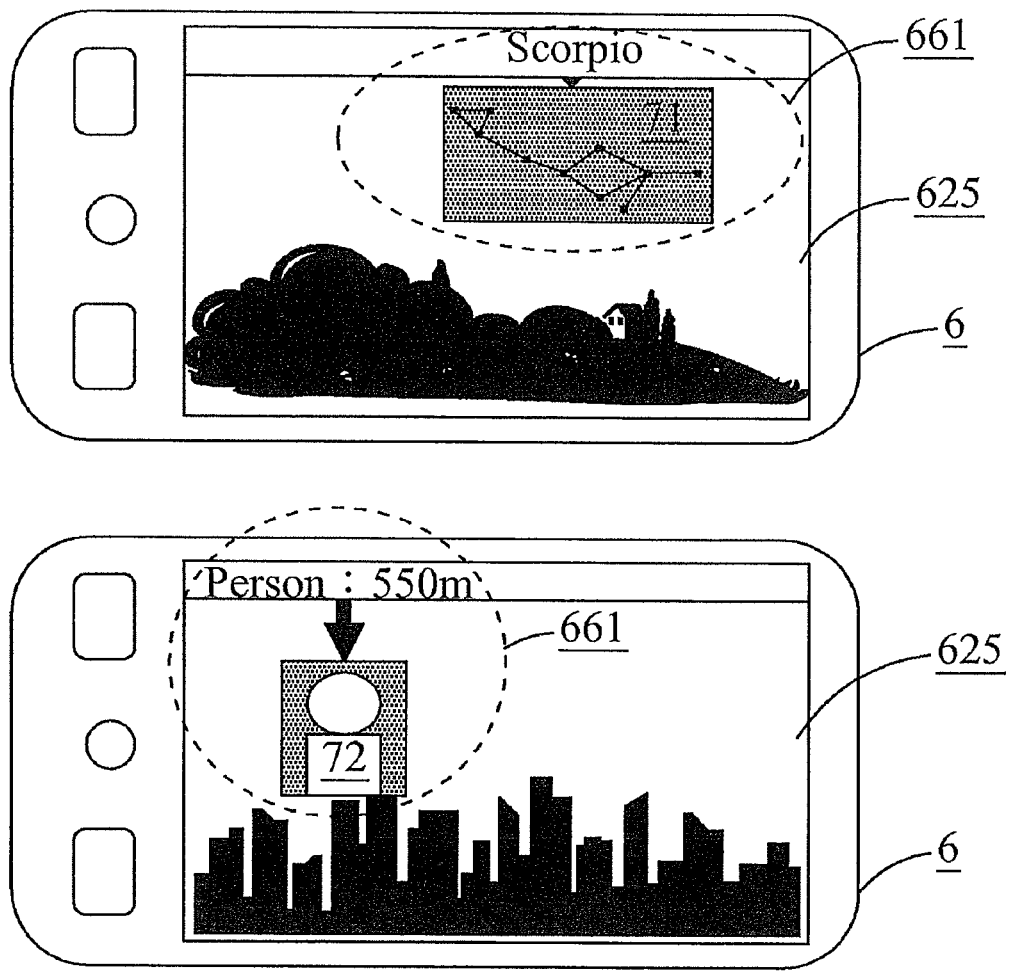
FIG. 7 shows the electronic device of FIG. 6 in use.

The microcontroller 64 also controls the display module 624 to show the object indicating message 661 or the object guiding message 662 at an adequate position in the view window area 625. For example, an object guiding message 662 reminding the user to move leftward is shown near a left side of the view window area 625, and an object guiding message 662 reminding the user to move rightward is shown near a right side of the view window area 625; and an object indicating message 661 is shown near an upper side of the view window area 625. The object indicating message 661 may also include a figure or a photo of the object. For example, as shown in FIG. 7, when the object is a constellation, the displayed object indicating message 661 may include a FIG. 71 of the constellation; or when the object is a contacting person, the displayed object indicating message 661 may include a photo 72 of the contacting person.

In addition to select an object from the data storage module 65 by the user to serve as a guiding basis for the portable device 6, the user may also utilize short message service (SMS) or multimedia message service (MMS) to request his or her friend or family to transmit a communication message 6311 capable of indicating the friend's or the family's current position, so that the portable device 6 may receive the communication message 6311 via the wireless communication module 631. In the case the communication message 6311 includes geographic coordinates indicating the position of the user's friend, the microcontroller 64 may directly compare these geographic coordinates with the coverage 623. In the case the communication message 6311 includes the friend's address or the name of the friend's current location, such as a restaurant name or a building name, the microcontroller 64 will determine the friend's current coordinates according to the electronic map 694, and then compares the determined coordinates with the coverage 623.

Further, the portable device 6 may also receive the coordinates of the object via the network linking module 633. For example, the user may browse web pages via the network linking module 633 to obtain the position data of an object; and the portable device 6 may use the object position data to perform the above-mentioned guiding operations. Alternatively, when the user and his or her friend send instant messages to each other via the network linking module 633, the instant messages may also include the object position data, based on which the portable device 6 may perform the above-mentioned guiding operations. When the received object position data is the position data of the friend sending the instant message, and the instant message is being continuously received, the user may use the portable device 6 and be guided to approach the friend in moving.

Figure 8:
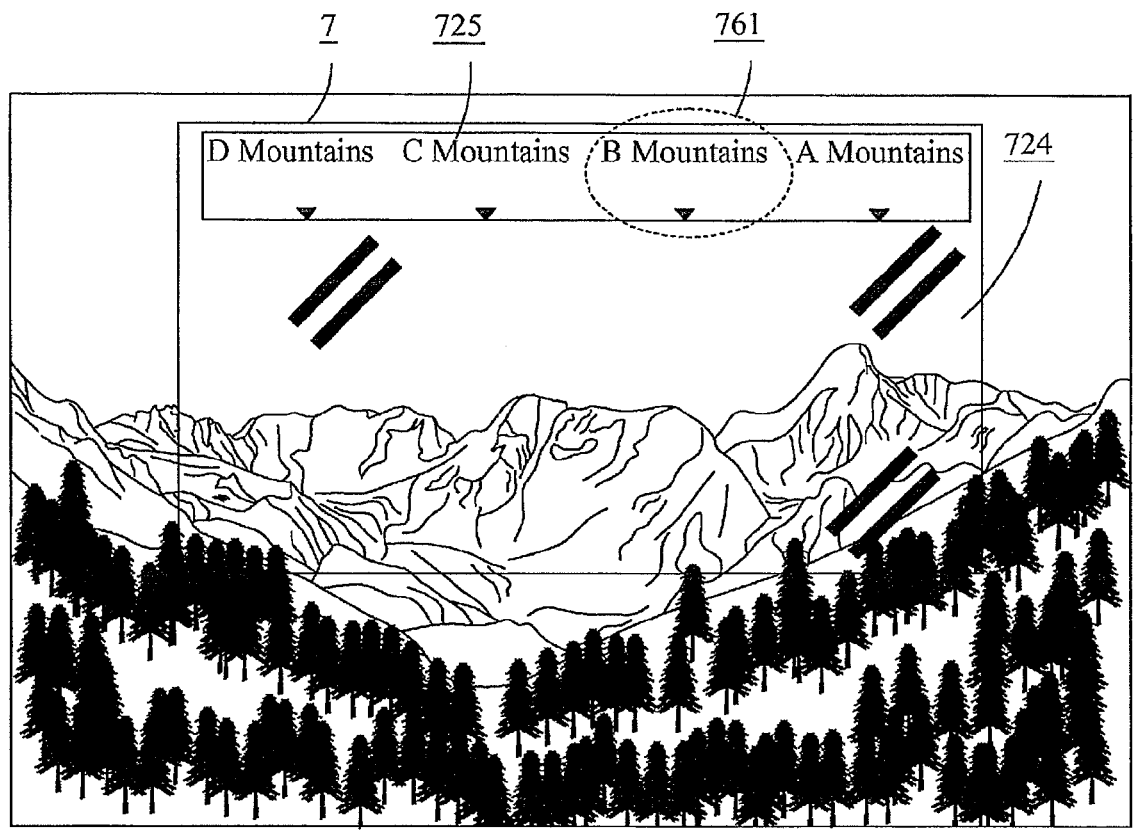
FIG. 8 shows an electronic device with object guiding function according to a second embodiment of the present invention in use.

Please refer to FIG. 8 that is a schematic view of an electronic device with object guiding function according to a second embodiment of the present invention. As shown, the electronic device in the second embodiment is a view observation device 7. The second embodiment is different from the first embodiment in that the view observation device 7 includes a light-transmitting mechanism 724 and a display module 725 to serve as the viewing unit. The light-transmitting mechanism 724 defines a view window area, and may be made of a light-pervious material, such as a glass material or an acrylate material, or simply a frame. Based on its own position and orientation and the area of the light-transmitting mechanism 724, the view observation device 7 is able to derive the coverage of the view being currently watched by the user using the view observation device 7, and further determines what objects are located in the coverage of the view, such as mountain ranges. Thereafter, the view observation device 7 may generate object indicating messages 761 corresponding to the objects in the coverage, such as Mountains A, Mountains B, Mountains C and Mountains D; and the object indicating messages 761 are shown in the display module 725. It is noted the positions of the object indicating messages 761 in the display module 725 also correspond to the mountain ranges located in the light-transmitting mechanism 724.

In the case the light-transmitting mechanism 724 is made of a glass material or an acrylate material, the display module 725 may be otherwise a projection module, which projects the corresponding object indicating messages 761 onto the glass or the acrylate for viewing by the user.

Figure 9:
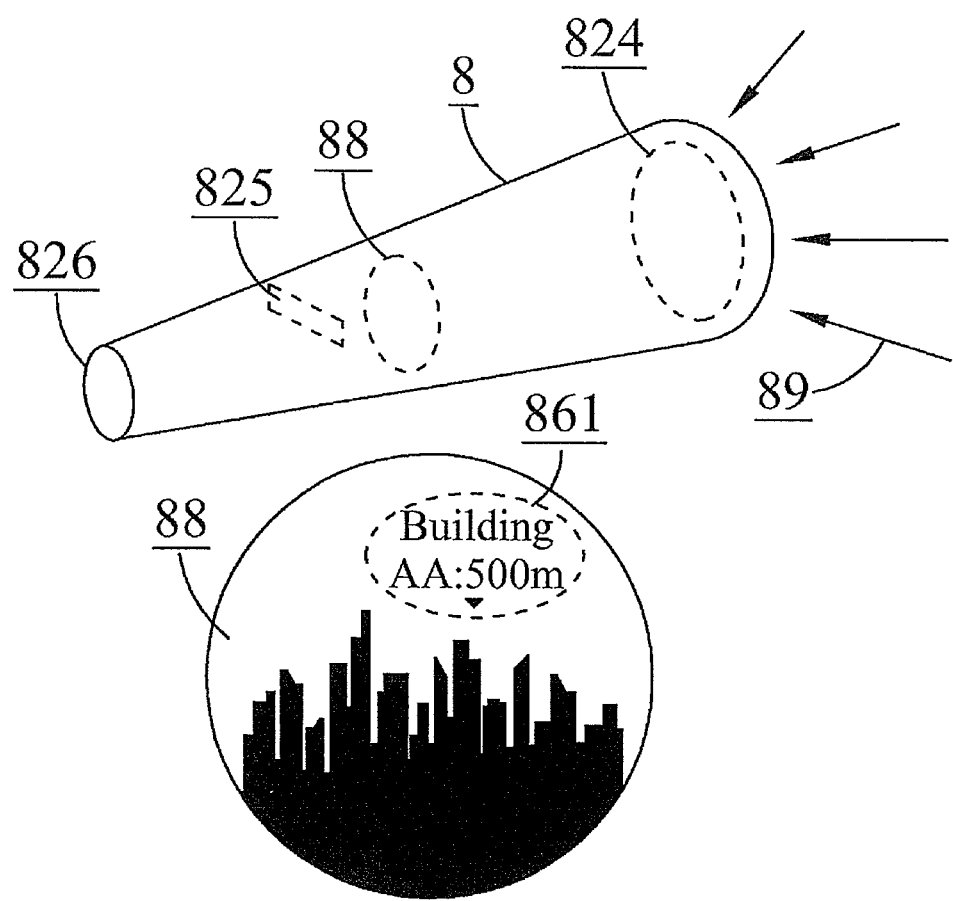
FIG. 9 shows an electronic device with object guiding function according to a third embodiment of the present invention in use.

FIG. 9 is a schematic view of an electronic device with object guiding function according to a third embodiment of the present invention. In the third embodiment, the electronic device is a telescope device 8. The third embodiment is different from other embodiments in that the telescope device 8 includes an optical lens module 824, a projection module 825, and an eyepiece module 826 serving as a viewing unit. The optical lens module 824 receives an optical signal 89 of the view and forms an image in a view window area 88. A user may watch the view window area 88 via the eyepiece module 826. The projection module 825 correspondingly projects an object indicating message 861 or an object guiding message generated by a microcontroller of the telescope device 8 to shown the messages in the view window area 88. Since the generation of the object indicating message 861 or the object guiding message has been described in the above paragraphs, it is not discussed in more details herein.

Figure 10:
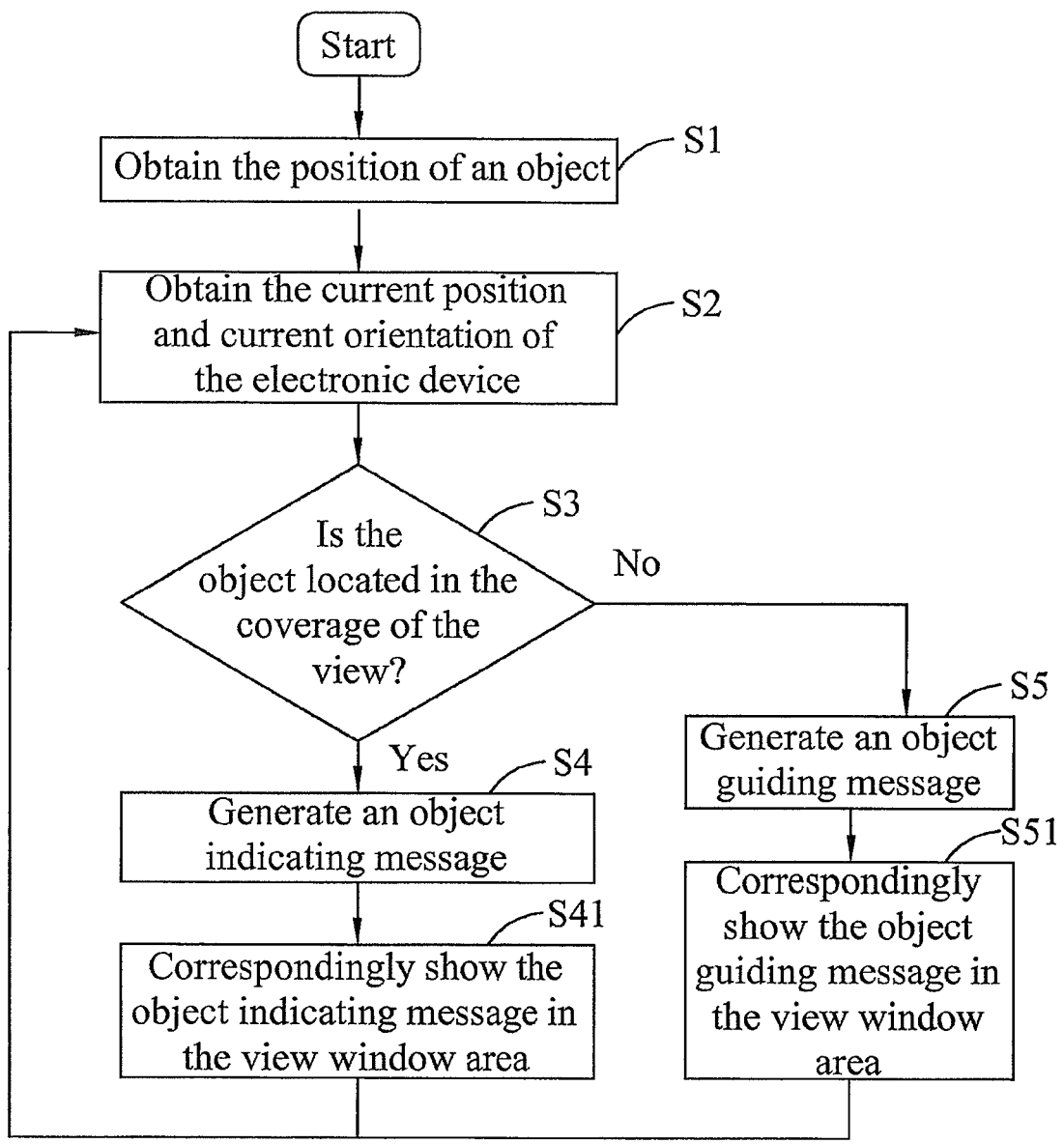
FIG. 10 is a flowchart showing the steps included in an object guiding method according to the present invention.

Please refer to FIG. 10, which is a flowchart showing the steps included in an object guiding method according to the present invention. The object guiding method is applicable to an electronic device with a viewing unit having a view window area, via which a user may watch a view. In a first step S1 of the method, an object position is obtained. The user may obtain the object position in different ways, including selecting one of many objects stored on the electronic device, linking the electronic device with Internet and selecting an object on a webpage, linking the electronic device with Internet and receiving an instant message, or using short message service (SMS) or multimedia message service (MMS).

Then, in a second step S2, the current position and the current orientation of the electronic device are obtained. The electronic device may be any one of the electronic devices illustrated in FIGS. 1, 6, 8 and 9 or other applicable electronic devices. Then, in a third step S3, determine whether the object is located in coverage of the view based on the current position and orientation of the electronic device, the view window area, and the object position. When the object is determined as being located in the coverage of the view, an object indicating message is generated in a fourth step S4. Thereafter, in a step S41 following the fourth step S4, the object indicating message is correspondingly shown in the view window area, such as the object indicating messages 161, 661, 761 and 861 respectively shown in FIGS. 2, 7, 8 and 9. The object indicating message may include, depending on actual need, a figure of the object, a photo of the object, or a distance between the object and the electronic device.

On the other hand, when the object is determined as not being located in the coverage of the view, an object guiding message is generated in a fifth step S5. Thereafter, in a step S51 following the fifth step S5, the object guiding message is correspondingly shown in the view window area. The object guiding message may be, for example, the object guiding message 162 shown in FIG. 2. After the step S41 or the step S51, the step S2 is repeated. Or, when the object is a moving object, such as a contacting person in moving, the step S1 is repeated after the step S41 or the step S51 to receive the new position of the moving object.

Further, in the case the viewing unit in the above embodiments has picture shooting function, the object indicating message may be stored along with picture data while the picture is taken and be recorded as the metadata or the tag information of a JPEG file. In this manner, the object indicating message may also be seen when the user views the picture at a later time.

Figure 11:
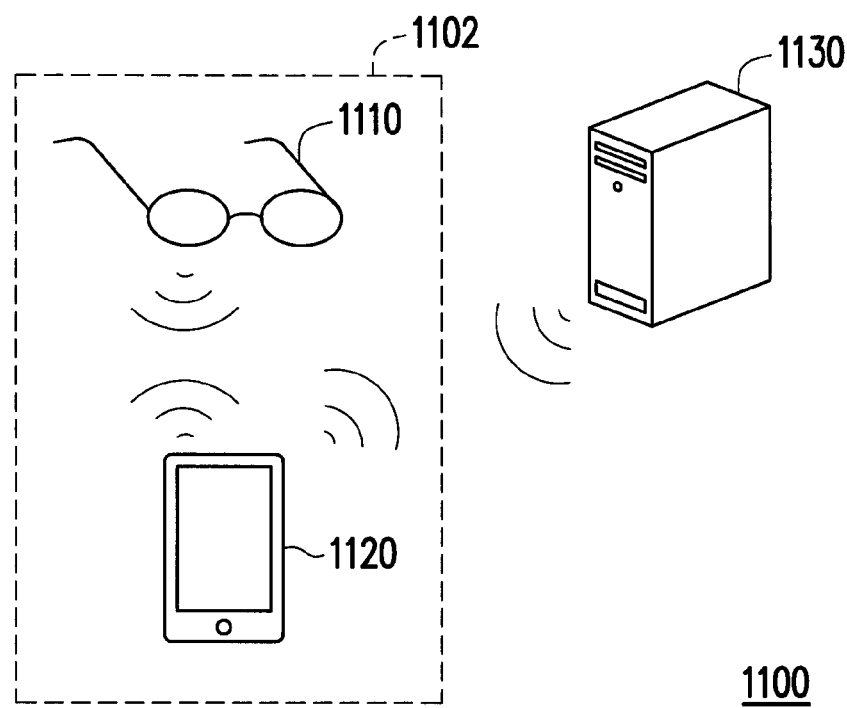
FIG. 11 is a schematic diagram of an augmented reality system according to a fourth embodiment.

Please refer to FIG. 11, which is a schematic diagram of an augmented reality system according to a fourth embodiment. An augmented reality system 1100 includes a mobile viewing system 1102 and a server 1130. The mobile viewing system 1102 is configured to display an object indicating message or an object guiding message, and the mobile viewing system may be implemented as one or several electronic devices. For example, the mobile viewing system 1102 includes an electronic device 1110 and an electronic device 1120. In this embodiment, the electronic device 1110 is implemented as electronic glasses, and the electronic device 1120 is implemented as a cell phone. However, the electronic devices 1110 and 1120 may be implemented as any other forms of mobile electronic devices in other embodiments. The electronic device 1110 at least includes a processing unit, an image capture module, a wireless communication module, and a viewing unit having a view window area, where a user may watches a view through the view window area. However, the functions of the processing unit, the image capture module, the wireless communication module, the viewing unit, and the view window area have been described above; therefore they will not be repeated. The electronic device 1110 communicates with the server 1130 through the electronic device 1120. For example, the electronic device 1110 communicates with the electronic device 1120 via bluetooth, and the electronic device 1120 communicates with the server 1130 via WiFi. In another embodiment, the mobile viewing system 1102 includes only one electronic device capable of communicating with the server 1130 directly and capable of displaying an object indicating message and an object guiding message. For example, the mobile viewing system 1102 has only one electronic device having forms of cell phone, which has a transparent display (i.e. the viewing unit), a camera (i.e. image capture module), a processing unit and a wireless communication module. Alternatively, the one electronic device may have forms of glasses having a WiFi module. The invention does not limit how many electronic devices are included in the mobile viewing system 1102. In yet another embodiment, the mobile viewing system 1102 may include a projector capable of displaying an object indicating message and object guiding message in the air.

Herein, when describing the operation of the mobile viewing system 1102, it represents the operation of the components, modules or units in electronic device 1110 or electronic device 1120, which will not be repeated again.

Figure 12:
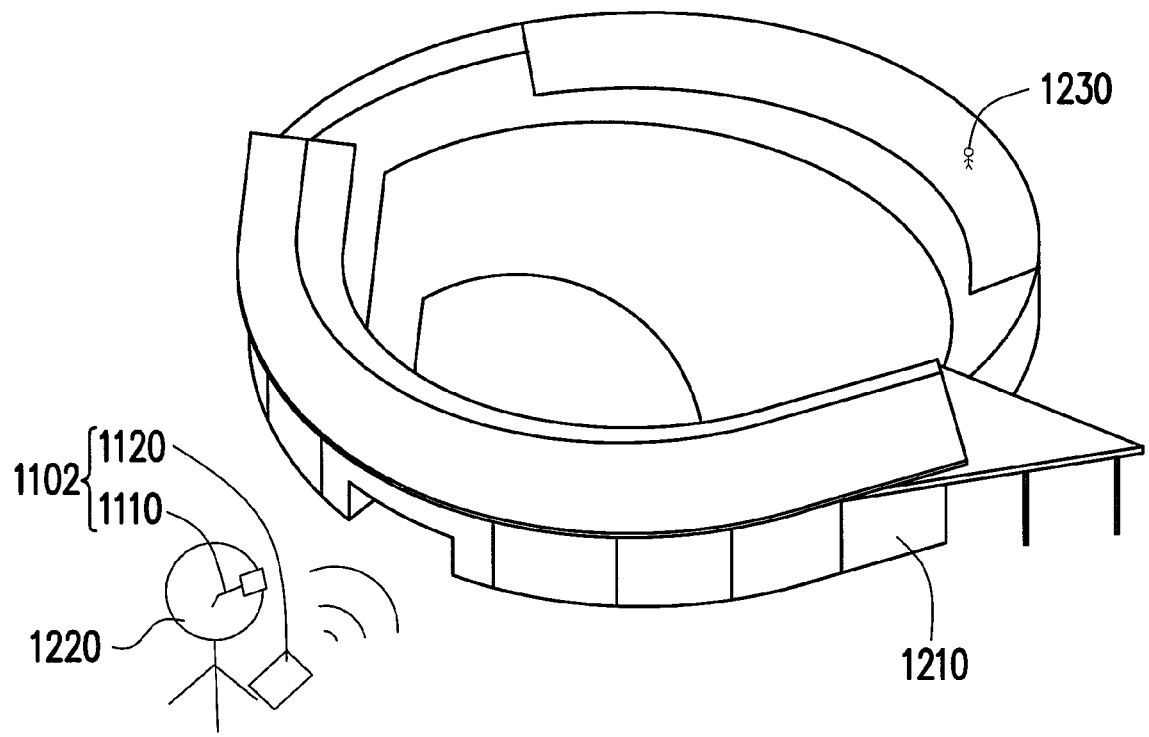
FIG. 12 is a top view of a building when a user enters the building.

Refer to FIG. 12, which is a top view of a building when a user enters the building. When a user enters a building 1210, it is registered that mobile viewing system 1102 enters the building 1210 at the server 1130. During the registering procedure, the mobile viewing system 1102 may also send a message to the server 1130 to indicate that the mobile viewing system 1102 is capable of displaying object guiding messages and object indicating messages. In one embodiment, the mobile viewing system 1102 has a near field communication (NFC) unit. The user may buy an electronic ticket online and use the NFC unit to register the electronic ticket at an entrance of the building 1210, that is, another NFC unit is disposed at the entrance. However, the user may register on a website when entering the building 1210 or using a QR code on a physical ticket to register in another embodiment. Alternatively, the server 1130 may have the phone number and the credit card number of a user, where the phone number is used to link to the mobile viewing system 1102. When the user buys a ticket in the building 1210 with his/her credit card, the server 1130 automatically registers that the mobile viewing system 1102 enters the building 1210 via the credit card number and the phone number. In the embodiment, the building 1210 is a stadium, but the user may enter a department store, a shopping mall, a museum, or a library in other embodiments, which is not limited in the invention.

After the registering procedure, the server 1130 locates the mobile viewing system 1102, and provides object guiding messages or object indicating messages for showing on the viewing unit of the mobile viewing system 1102. In detail, there are a plurality of wireless access points (APs) disposed in the building 1210, and the mobile viewing system 1102 connects to some of the wireless APs (also referred as first wireless access points) when entering the building 1210. For example, the wireless APs are WiFi APs, and the server 1130 stores a data base recording the location of each of the wireless APs. Therefore, the locations of the mobile viewing system 1102 are obtained according to the locations of the wireless APs which the mobile viewing system 1102 connects to by the server 1130. For example, the server 1130 may estimate the location according to the amplitude of WiFi signals and the locations of the connected wireless access points. In one embodiment, the mobile viewing system 1102 automatically reports the connected wireless APs to the servers 1130; but in another embodiment, the server 1130 may request the mobile viewing system 1102 to report the connected wireless APs or automatically detect which wireless APs are connected to the mobile viewing system 1102.

Images captured by the mobile viewing system 1102 are used to refine the location of the mobile viewing system 1102. To be specific, the data base stored in the server 1130 also records a plurality of building objects in the building 1210. The building objects may be doors, signs, vending machine, lines in the field, lamp with a specific color, or something conspicuous in the building 1210, which is not limited in the invention. The location and the image of each of the building objects are also stored in the data base. The images of the building objects are previously captured by some workers or by monitors in the building 1210. When the image capture module of the mobile viewing system 1102 captures an image and the mobile viewing system 1102 transmits the image to the server 1130, the server 1130 recognizes an object (also referred as a first object) in the image as one of the building objects and refines the location of the mobile viewing system 1102 according to the location of the recognized building object and the orientation of the mobile viewing system 1102. The orientation of the mobile viewing system 1102 may be provided by a positioning unit or an electronic compass disposed in the mobile view system 1102, where the orientation is transmitted to the server 1130 as well. In other words, the location of mobile viewing system 1102 is obtained by the connected wireless APs and the captured image, instead of GPS.

In this embodiment, the image for refining the location of the mobile viewing system 1102 is automatically captured by the mobile viewing system 1102. For example, when the user 1220 is in the building 1210, the mobile viewing system 1102 periodically transmits the image to the server 1130. However, in another embodiment, the server 1130 may send a request message to the mobile viewing system 1102, and the mobile viewing system 1102 captures the image according to the request message. Alternatively, the mobile viewing system 1102 may transmit the image when the connected wireless APs are changed. For example, when the user 1220 goes from the area of one wireless AP to the area of another wireless AP, the mobile viewing system 1102 captures a new image and automatically transmits the new image to the server 1130.

After the location of the mobile viewing system 1102 is obtained, the server 1130 generates an object guiding message or an object indicating message according to the locations of the mobile viewing system 1102. The generated message is transmitted to the mobile viewing system 1102 and displayed on the viewing unit of the mobile viewing system 1102. In one application, the user 1220 tries to find the location of a contact 1230 carrying another mobile device (e.g. a cell phone or another mobile viewing system) which has been registered at the server 1130. The user 1220 inputs the phone number or the name of the contact 1230 on the mobile viewing system 1102, then the mobile viewing system 1102 transmits a request message to the server 1130 for querying the location of the contact 1230. The server 1130 sends a message to the contact's mobile device to acquire his/her approval. If the contact 1230 agrees to expose his/her location, the contact 1230 sends a confirm message to the server 1130, then the server 1130 obtains the location of the contact 1230 (e.g. via wireless APs) and generates an object guiding message for guiding the user 1220 toward to the contact 1230. After the server 1130 transmits the object guiding message to the mobile viewing system 1102, the mobile viewing system 1102 displays the object guiding message on its viewing unit. For example, the object guiding message tells the user 1220 to turn right and go straight to reach the contact's location.

In another application, the user 1220 wants to go to a target place (e.g. a rest room, an exit, or a restaurant in a department store) in the building 1210. The user 1220 inputs the target place on the mobile viewing system 1102 and the mobile viewing system 1102 transmits a request message to the server for querying the target place. In this application, a plurality of monitors are disposed in the building 1210, and the server 1130 may obtain the images captured by the monitors. The server 1130 estimates crowdedness according to the images captured by the monitors and estimates a path from the mobile viewing system 1102 to the target place according to the crowdedness. For example, the server 1130 applies a human detection algorithm on the images to count how many people are in the field of view of the monitors. Or, the server 1130 may apply a background extraction algorithm on the images to see if there are many foreground objects in the field of view of the monitors. There may be more than one rest rooms or exits in the building 1210, or more than one path to the target place; and the server 1130 estimates the shortest path or the path having least people. Then, the server 1130 generates the object guiding message according to the estimated path and transmits the object guiding message to the mobile viewing system 1102. The mobile viewing system 1102 displays the object guiding message on its viewing unit to guide the user 1220 to the target place.

In the embodiment, the server 1130 is capable of requesting the mobile viewing system 1102 to capture a new image to generate an object indicating message. For example, the server 1130 first obtains the location of the mobile viewing system 1102 via wireless APs or GPS, then determines if there is an informative object near the mobile viewing system 1102 (e.g. in the coverage of the view) according to the orientation and the location of the mobile viewing system 1102. The informative object may be a sign, a player, or any other object which the user 1220 may be interested in. If there is an informative object near the mobile viewing system 1102, the server 1130 sends a request message to the mobile viewing system 1102 to capture an image of the informative object. The server 1130 may also control the capture angle or the focal length of the image capture module in the mobile viewing system 1102, which is not limited in the invention. After capturing the image of the informative object, the mobile viewing system 1102 transmits the captured image to the server 1130, and the server 1130 recognizes the informative object. If the server 1130 detects that the captured image is too blurred to recognize the informative object, the server 1130 sends another request message to the mobile viewing system to capture another image. After recognizing the informative object, the server 1130 generates an object indicating message according to the image of the informative object. For example, the server 1130 finds information corresponding to the informative object from the data base or the internet, where the information may be a batting average of a player, a discount or a price of a product, or a history of an antique. The generated object indicating message is corresponding to the informative object and is transmitted to the mobile viewing system 1102. After that, the mobile viewing system 1102 displays the object indicating message on its viewing unit.

Figure 13:
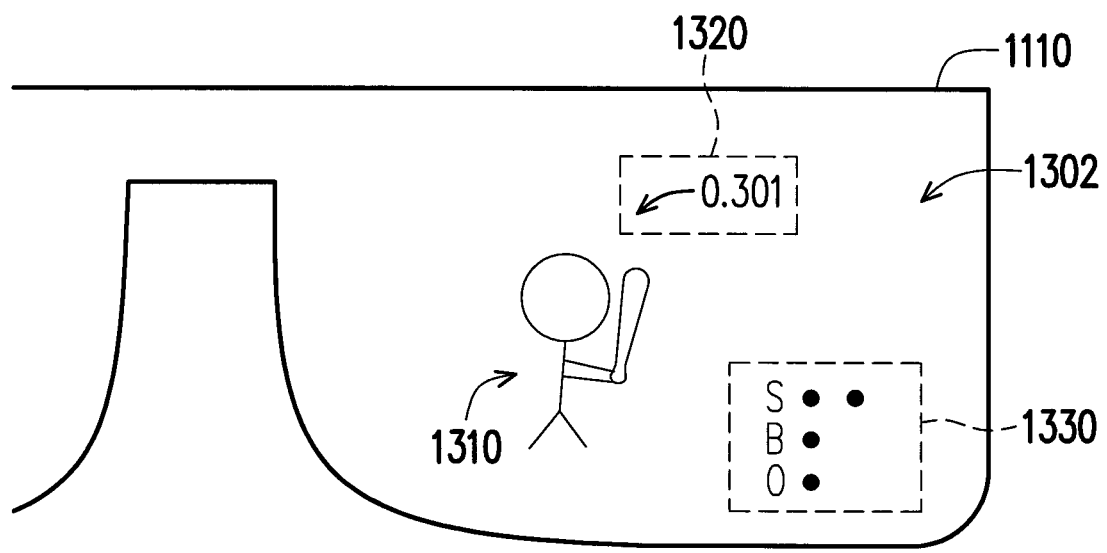
FIG. 13 is a schematic diagram illustrating an object indicating message according to an embodiment.

Refer to FIG. 13, which is a schematic diagram illustrating an object indicating message according to an embodiment. The user watches a view via a view window area 1302, and an informative object 1310 is in the coverage of the view. The informative object 1310 is a player, the object indicating message 1320 provides the batting average of the player, and the object indicating message 1330 provides current counts. Once an object indicating message is displayed on the mobile viewing system 1102, the recognition task may be shifted to the mobile viewing system 1102. For example, after the object indicating message 1320 is displayed, the mobile viewing system 1102 tracks the informative object 1310 and displays the object indicating message 1320 near the informative object 1320. If the mobile viewing system 1102 lost the tracking of the informative object 1310, the mobile viewing system 1102 captures a new image for recognizing the informative object 1320 again. In detail, the mobile viewing system 1102 determines if a recognition result of the informative object is correct (e.g. if a tracking score is larger than a threshold). If the recognition result is not correct, the mobile viewing system 1102 captures an image of the informative object 1320 and transmits the captured image to the server 1130. The server 1130 recognizes the informative object 1310 according to the image for updating the recognition result, that is, the mobile viewing system 1102 may start another tracking according to the updated recognition result. On the other hand, the mobile viewing system 1102 receives an update message from the server 1130 to update the object indicating message 1330 (update the current count) without capturing an image and recognizing an object. Therefore, the mobile viewing system 1102 transmits fewer images to the server 1130.

In another embodiment, the server 1130 actively sends an object guiding message or an objecting indicating message to the mobile viewing system 1102 to inform of something interesting. For example, when the user 1220 is watching a game and the server 1130 detects that there is a celebrity in the building, the server 1130 transmits an object guiding message to the mobile viewing system 1102 to tell where the celebrity is. Similarly, the server 1130 may also transmit the object guiding message to tell where a beer seller, a sales event, or a store is. Alternatively, if the user approaches a specific place, the server 1130 may provide information corresponding to the specific place. For example, if the user approaches a sales event, an object indicating message about the price of a product may be received from the server 1130, even when the product is not in the coverage of the view.

Figure 14:
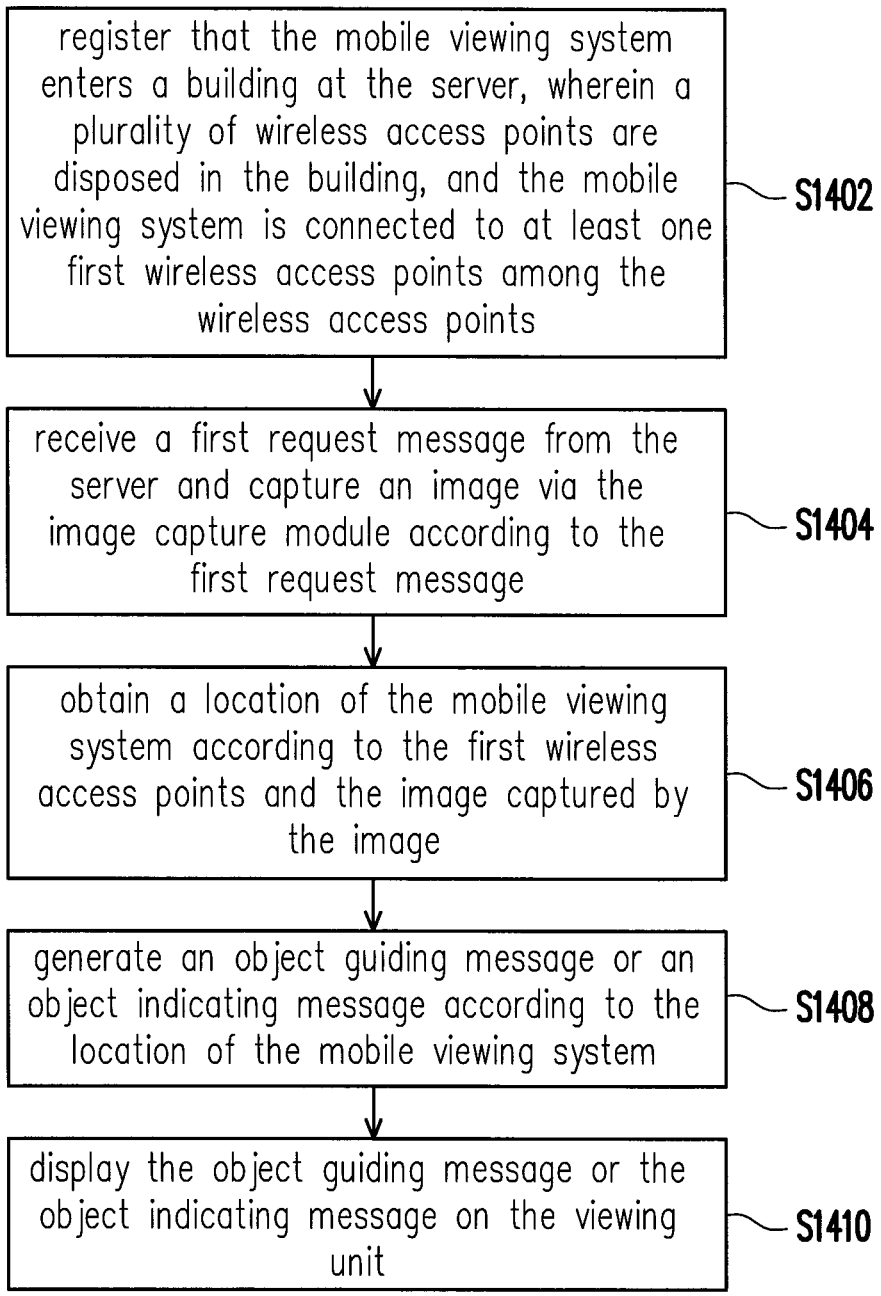
FIG. 14 is a flow chart of an object indicating method according to an embodiment.

Refer to FIG. 14, which is a flow chart of an object indicating method according to an embodiment. In step S1402, it is registered that the mobile viewing system enters a building at the server, wherein a plurality of wireless access points are disposed in the building, and the mobile viewing system is connected to at least one first wireless access points among the wireless access points. In step S1404, a first request message is received from the server and an image is captured via the image capture module according to the first request message. In step S1406, a location of the mobile viewing system is obtained according to the first wireless access points and the image captured by the image capture module. In step S1408, an object guiding message or an object indicating message is generated according to the location of the mobile viewing system. In step S1410, the object guiding message or the object indicating message is displayed on the viewing unit. However, each step in FIG. 14 has been described above, and they will not be repeated.

The present invention has been described with some preferred embodiments thereof and it is understood that many changes and modifications in the described embodiments may be carried out without departing from the scope and the spirit of the invention that is intended to be limited only by the appended claims.

What is claimed is:

1. An object indicating method for an augmented reality system, wherein the augmented reality system comprises a mobile viewing system and a server, the mobile viewing system comprises an image capture module and a viewing unit, the objecting indicating method comprising:
   registering that the mobile viewing system enters a building at the server, wherein a plurality of wireless access points are disposed in the building, and the mobile viewing system is connected to at least one first wireless access point among the wireless access points;
   receiving a first request message from the server and capturing an image via the image capture module according to the first request message;
   obtaining a location of the mobile viewing system according to the at least one first wireless access point and the image captured by the image capture module;
   generating an object guiding message or an object indicating message according to the location of the mobile viewing system; and
   displaying the object guiding message or the object indicating message on the viewing unit.

2. The object indicating method as claimed in claim 1, further comprising:
   transmitting a second request message to the server for querying a location of a contact, wherein the contact is registered at the server;
   receiving a confirm message from the contact and obtaining the location of the contact by the server;
   generating the object guiding message for guiding a user of the mobile viewing system toward to the contact;
   transmitting the object guiding message to the mobile viewing system; and
   displaying the object guiding message on the viewing unit.

3. The object indicating method as claimed in claim 1, wherein a plurality of monitors are disposed in the building, and the object indicating method further comprising:
   transmitting a third request message to the server for querying a target place in the building;
   estimating crowdedness according to a plurality of images captured by the monitors;
   estimating a path from the mobile viewing system to the target place according to the crowdedness;
   generating the object guiding message according to the path;
   transmitting the object guiding message to the mobile viewing system; and
   displaying the object guiding message on the viewing unit.

4. The object indicating method as claimed in claim 1, further comprising:
   determining if there is an informative object near the mobile viewing system according to an orientation and the location of the mobile viewing system by the server;
   if there is an informative object near the mobile viewing system, sending a fourth request message to the mobile viewing system for capturing an image of the informative object by the server;

capturing the image of the informative object and transmitting the image of the informative object to the server;

recognizing the informative object and generating the object indicating message according to the image of the informative object, wherein the object indicating message corresponds to the informative object;

transmitting the object indicating message to the mobile viewing system; and displaying the object indicating message on the viewing unit.

5. The object indicating method as claimed in claim 1, wherein a user of the mobile viewing system watches a view through a view window area of the viewing unit, the object indicating message corresponds to an informative object in a coverage of the view, and the object indicating method further comprises:

tracking the informative object and displaying the object indicating message; and receiving an update message from the server to update the object indicating message without capturing an image of the informative object.

6. The object indicating method as claimed in claim 5, further comprising:

determining if a recognition result of the informative object is correct;

if the recognition result is not correct, capturing a second image of the informative object and transmitting the second image to the server; and recognizing the informative object according to the second image for updating the recognition result.

7. An augmented reality system, comprising:

a server; and a mobile viewing system, comprising an image capture module and a viewing unit, wherein the mobile viewing system registers that the mobile viewing system enters a building at the server, wherein a plurality of wireless access points are disposed in the building, and the mobile viewing system is connected to at least one first wireless access point among the wireless access points, wherein the mobile viewing system receives a first request message from the server and captures an image via the image capture module according to the first request message, wherein the server obtains a location of the mobile viewing system according to the at least one first wireless access point and the image captured by the image capture module, and generates an object guiding message or an object indicating message according to the location of the mobile viewing system, wherein the mobile viewing system displays the object guiding message or the object indicating message on the viewing unit.

8. The augmented reality system as claimed in claim 7, wherein the mobile viewing system registers an electronic ticket via a near field communication (NFC) unit disposed on the mobile viewing system and a NFC unit disposed at an entrance of the building.

9. The augmented reality system as claimed in claim 7, wherein the server stores a data base recoding a location of each of the wireless access point, a plurality of building objects in the building and a location of the each of the building objects, wherein the mobile viewing system reports the at least one first wireless access point to the server, and transmits the image captured by the image capture module to the server, wherein the server recognizes a first object in the image as one of the building objects, and obtains the location of the mobile viewing system according to the location of the one of the building objects, the locations of the at least one first wireless access point, and an orientation of the mobile viewing system.

10. The augmented reality system as claimed in claim 7, wherein the mobile viewing system transmits a second request message to the server for querying a location of a contact, wherein the contact is registered at the server, wherein the server receives a confirm message from the contact and obtains the location of the contact, wherein the server generates the object guiding message for guiding a user of the mobile viewing system toward to the contact, and transmits the object guiding message to the mobile viewing system, wherein the mobile viewing system displays the object guiding message on the viewing unit.

11. The augmented reality system as claimed in claim 7, wherein a plurality of monitors are disposed in the building, and the mobile viewing system transmits a third request message to the server for querying a target place in the building, wherein the server estimates crowdedness according to a plurality of images captured by the monitors, estimates a path from the mobile viewing system to the target place according to the crowdedness, generates the object guiding message according to the path, and transmits the object guiding message to the mobile viewing system, wherein the mobile viewing system displays the object guiding message on the viewing unit.

12. The augmented reality system as claimed in claim 7, wherein the server determines if there is an informative object near the mobile viewing system according to an orientation and the location of the mobile viewing system;

if there is an informative object near the mobile viewing system, the server sends a fourth request message to the mobile viewing system for capturing an image of the informative object, wherein the mobile viewing system captures the image of the informative object and transmitting the image of the informative object to the server, wherein the server recognizes the informative object and generating the object indicating message according to the image of the informative object, wherein the object indicating message corresponds to the informative object, wherein the server transmits the object indicating message to the mobile viewing system, and the mobile viewing system displays the object indicating message on the viewing unit.

13. The augmented reality system as claimed in claim 7, wherein a user of the mobile viewing system watches a view through a view window area of the viewing unit, the object indicating message corresponds to an informative object in a coverage of the view, and the mobile viewing system tracks the informative object and displaying the object indicating message, wherein the mobile viewing system receives an update message from the server to update the object indicating message without capturing an image of the informative object.

14. The augmented reality system as claimed in claim 13, wherein the mobile viewing system determines if a recognition result of the informative object is correct, if the recognition result is not correct, the mobile viewing system captures a second image of the informative object and transmits the second image to the server, wherein the server recognizes the informative object according to the second image for updating the recognition result.

15. A mobile viewing system, comprising:
a viewing unit;
an image capture module; and
a processing unit, wherein the processing unit registers that the mobile viewing system enters a building at the server, wherein a plurality of wireless access points are disposed in the building, and the mobile viewing system is connected to at least one first wireless access point among the wireless access points,
wherein the processing unit receives a first request message from the server and the image capture module captures an image according to the first request message,
wherein the processing unit displays an object guiding message or an object indicating message received from the server on the viewing unit, wherein a location of the mobile viewing system is obtained by the server according to the at least one first wireless access point and the image captured by the image capture module, and the object guiding message or the object indicating message is generated by the server according to the location of the mobile viewing system.

16. The mobile viewing system as claimed in claim 15, further comprising a near field communication (NFC) unit, wherein the processing unit registers an electronic ticket via the near field communication (NFC) unit disposed on the mobile viewing system and a NFC unit disposed at an entrance of the building.

17. The mobile viewing system as claimed in claim 15, wherein the processing unit transmits a second request message to the server for querying a location of a contact, and the contact is registered at the server,
wherein the processing unit displays the object guiding message on the viewing unit, and the object guiding message is generated by the server for guiding a user of the mobile viewing system toward to the contact after the server receives a confirm message from the contact and the location of the contact is obtained by the server.

18. The mobile viewing system as claimed in claim 15, wherein a plurality of monitors are disposed in the building, and the processing unit transmits a third request message to the server for querying a target place in the building,
wherein the processing unit displays the object guiding message on the viewing unit, the object guiding message is generated according to a path estimated according to crowdedness from the mobile viewing system to the target place, and the crowdedness is estimated according to a plurality of images captured by the monitors.

19. The mobile viewing system as claimed in claim 15, wherein a user of the mobile viewing system watches a view through a view window area of the viewing unit, the object indicating message corresponds to an informative object in a coverage of the view, and the processing unit tracks the informative object and displays the object indicating message,
wherein the processing unit receives an update message from the server to update the object indicating message without capturing an image of the informative object.

20. The mobile viewing system as claimed in claim 19, wherein the processing unit determines if a recognition result of the informative object is correct,
if the recognition result is not correct, the image capture module captures a second image of the informative object and the processing unit transmits the second image to the server, wherein the informative object is recognized by the server according to the second image for updating the recognition result.

* * * * *